US011679725B2

(12) United States Patent
Ludwig et al.

(10) Patent No.: US 11,679,725 B2
(45) Date of Patent: Jun. 20, 2023

(54) MODULAR REMOVABLE SPEAKER SYSTEM

(71) Applicant: Harman International Industries, Incorporated, Stamford, CT (US)

(72) Inventors: Chris Ludwig, Bloomfield Hills, MI (US); Lars Goller, Herning (DK)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/161,533

(22) Filed: Jan. 28, 2021

(65) Prior Publication Data

US 2021/0237659 A1    Aug. 5, 2021

Related U.S. Application Data

(60) Provisional application No. 62/968,053, filed on Jan. 30, 2020.

(51) Int. Cl.
*B60R 11/02* (2006.01)
*H04R 1/02* (2006.01)
*H04R 9/02* (2006.01)

(52) U.S. Cl.
CPC .......... *B60R 11/0217* (2013.01); *H04R 1/025* (2013.01); *H04R 9/022* (2013.01); *B60R 2011/0288* (2013.01); *H04R 2420/07* (2013.01); *H04R 2420/09* (2013.01); *H04R 2499/13* (2013.01)

(58) Field of Classification Search
CPC ......... B60R 11/0217; B60R 2011/0288; B60R 16/033; B60R 2011/0003; H04R 1/025; H04R 9/022; H04R 2420/07; H04R 2420/09; H04R 2499/13; H04R 1/02; H04R 5/023; H04R 2201/028; H04R 1/1025; H02J 7/0045
See application file for complete search history.

(56) References Cited

U.S. PATENT DOCUMENTS 4,860,361 A * 8/1989 Sato .................... H03F 1/52
                                              381/59
5,864,627 A    1/1999 Kim
8,837,140 B2 * 9/2014 Zurowski .......... H05K 7/20154
                                              361/691
(Continued)

FOREIGN PATENT DOCUMENTS

GB    2343164 A  *  5/2000  ........ B60H 1/00507
JP    2007234368 A  *  9/2007  ............ H01M 10/50
(Continued)

OTHER PUBLICATIONS

"JBL Voyager—Integrated Home Audio System with Portable Wireless Speaker," JBL Website, Available Online at https://www.jbl.com/award-winners/JBL+VOYAGER.html, Available as Early as Jun. 22, 2017, 6 pages.

(Continued)

*Primary Examiner* — Oyesola C Ojo
(74) *Attorney, Agent, or Firm* — McCoy Russell LLP

(57) ABSTRACT

Methods and systems are provided for a portable speaker arranged in a vehicle. In one example, a system comprises a speaker configured to dock mechanically to a docking station in an area of a vehicle, wherein the speaker further comprises a removable battery.

19 Claims, 7 Drawing Sheets

(56) References Cited

U.S. PATENT DOCUMENTS

| | | | | |
|---|---|---|---|---|
| 9,860,660 | B1* | 1/2018 | Bosscher | H04R 3/007 |
| 10,097,922 | B2* | 10/2018 | Fathollahi | G06F 3/162 |
| 10,317,960 | B2* | 6/2019 | Wong | G06F 1/203 |
| 2008/0174959 | A1* | 7/2008 | Sano | H05K 7/20209 |
| | | | | 361/695 |
| 2017/0105069 | A1* | 4/2017 | Mezzomo | H04R 1/026 |
| 2017/0127204 | A1* | 5/2017 | Fisher | H02J 7/0044 |
| 2017/0142508 | A1* | 5/2017 | Prommersberger | H04R 1/026 |
| 2017/0251305 | A1 | 8/2017 | Fathollahi | |
| 2017/0341592 | A1* | 11/2017 | Ito | H04R 1/025 |
| 2019/0141446 | A1* | 5/2019 | Moritoki | H04R 3/08 |
| 2020/0039320 | A1* | 2/2020 | Hwang | H04R 3/007 |
| 2020/0238872 | A1* | 7/2020 | Switalski | H04R 1/028 |

FOREIGN PATENT DOCUMENTS

| | | | | |
|---|---|---|---|---|
| JP | 2009279980 A | * | 12/2009 | B60R 1/32 |
| WO | 2021195217 A1 | | 9/2021 | |

OTHER PUBLICATIONS

"Blaupunkt car radio brochure 1963," Classic Cult Website, Available Online at https://www.classiccult.com/BLOG/BLAUPUNKT-AUTORADIO-kofferradio-prospekt-1963.html, Available as Early as Aug. 28, 2013, 11 pages.

European Patent Office, Extended European Search Report Issued in Application No. 20215361.5, dated Nov. 10, 2021, Germany, 21 pages.

* cited by examiner

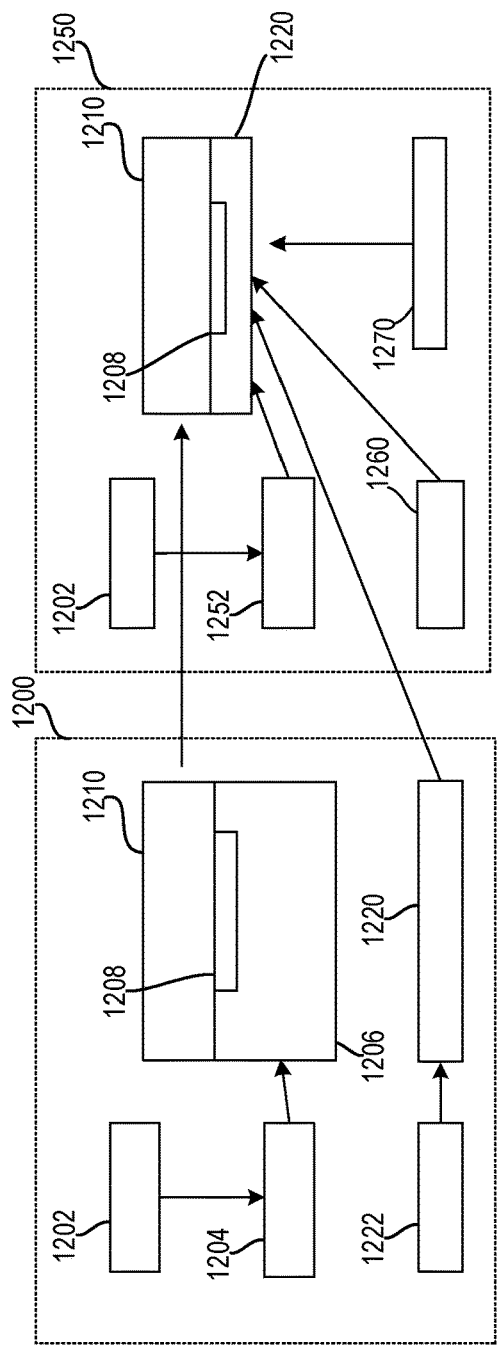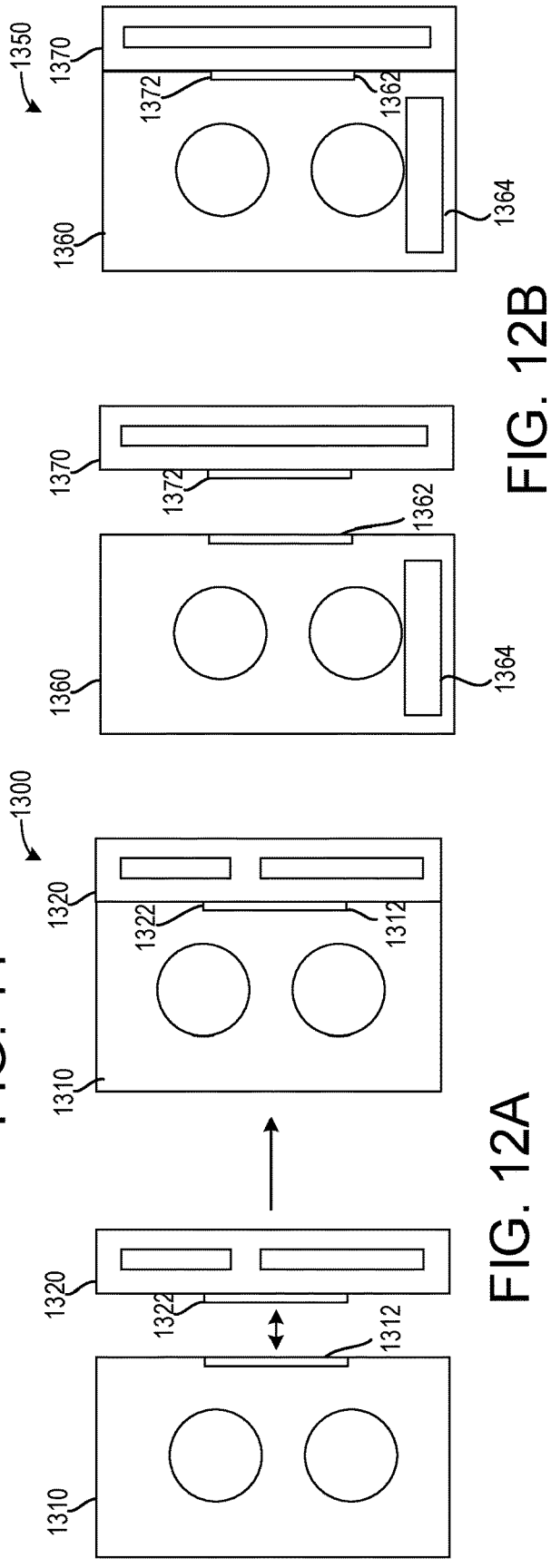

MODULAR REMOVABLE SPEAKER SYSTEM

CROSS REFERENCE TO RELATED APPLICATIONS

The present application claims priority to U.S. Provisional Patent Application No. 62/968,053, entitled "MODULAR REMOVABLE SPEAKER SYSTEM", and filed on Jan. 30, 2020. The entire contents of the above-listed application are hereby incorporated by reference for all purposes.

FIELD

The present description relates generally to a speaker system that is operable within a vehicle audio system and also operable independent of the vehicle audio system as a portable speaker.

BACKGROUND/SUMMARY

Portable speaker systems that are operable with multiple audio systems are known. For example, the Voyager by JBL® is an integrated home audio system with a portable wireless speaker that is detachable from a dock and communicates with other media devices as a portable speaker.

Vehicle audio systems typically include speakers that are distributed around the vehicle interior to provide sound. Premium vehicle audio systems often include large subwoofers with dedicated amplifiers. Due to their size, these large subwoofers are often mounted in the rear portion of a vehicle, e.g., in the trunk or in the rear storage compartment.

Thus, there may be a demand for vehicles to include docks or other mounts configured to receive a portable speaker. In one embodiment of the present disclosure, a system, comprises a speaker configured to dock mechanically to a docking station in an area of a vehicle, wherein the speaker further comprises a removable battery.

In another embodiment, a vehicle comprises a plurality of docking stations arranged in different areas of the vehicle, wherein each docking station of the plurality of docking stations is configured to receive a portable speaker operable when docked to a docking station and when not docked to the docking station, wherein the portable speaker comprises at least a removable battery.

In a further embodiment, a method comprises intrusively activating one or more vents to provide zonal cooling to a plurality of portable speakers docked in a vehicle in response a speaker temperature exceeding a threshold temperature.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 11 illustrates the portable speaker used when docked in a docking station and when removed from the docking station;

FIG. 12A illustrates an embodiment of the portable speaker with a removable battery and electronics package;

FIG. 12B illustrates an embodiment of the portable speaker with a removable battery.

DETAILED DESCRIPTION

Figure 1:
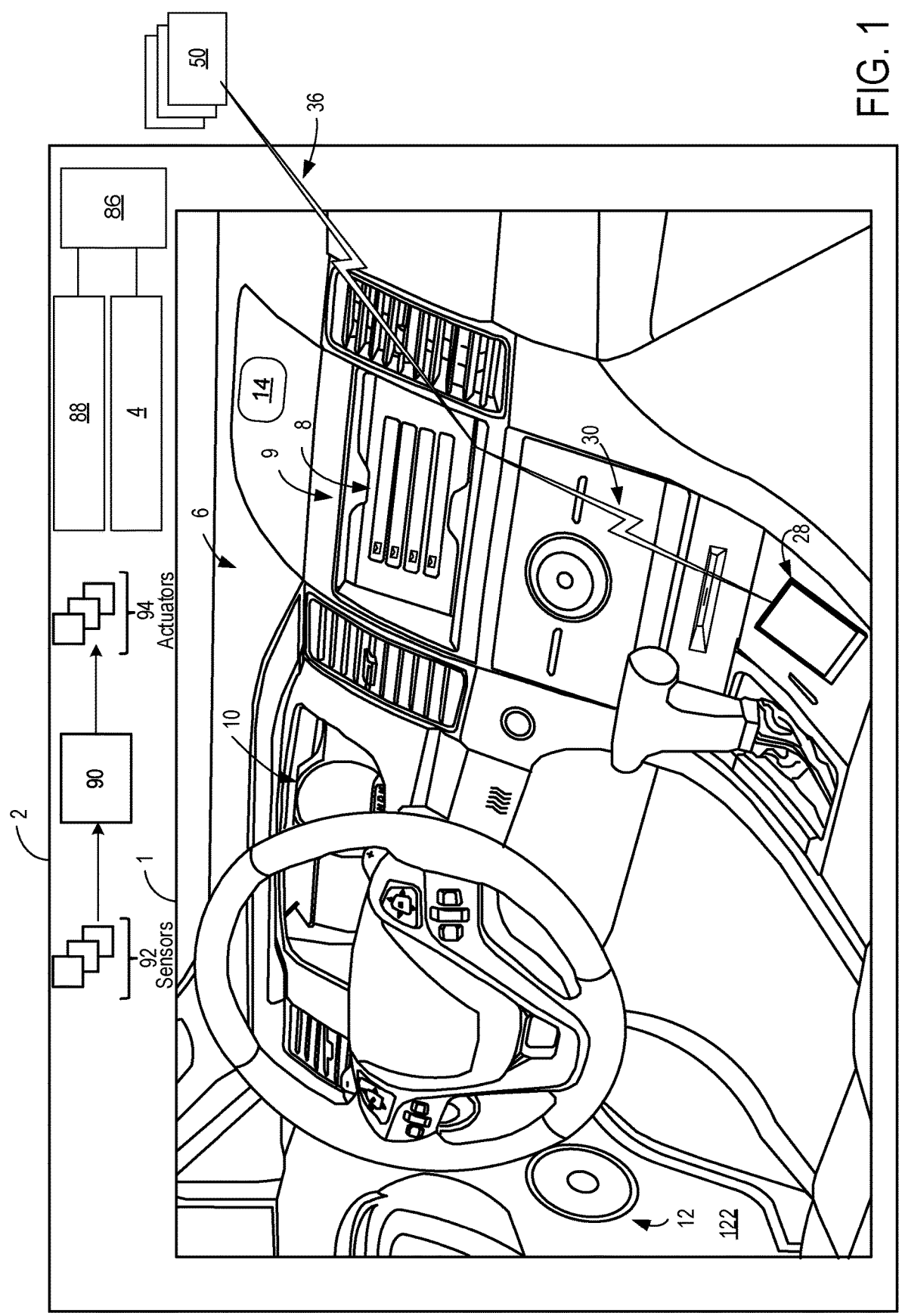
FIG. 1 shows an example partial view of a vehicle cabin in accordance with one or more embodiments of the present disclosure.

FIG. 1 shows an example partial view of one type of environment for a communication system, such as an interior of a cabin 1 of a vehicle 2, in which a driver and/or one or more passengers may be seated. Vehicle 2 of FIG. 1 may be a motor vehicle including drive wheels (not shown) and an internal combustion engine 4. Internal combustion engine 4 may include one or more combustion chambers, which may receive intake air via an intake passage and exhaust combustion gases via an exhaust passage. Vehicle 2 may be a road automobile, among other types of vehicles. In some examples, vehicle 2 may include a hybrid propulsion system including an energy conversion device operable to absorb energy from vehicle motion and/or the engine and convert the absorbed energy to an energy form suitable for storage by an energy storage device. Vehicle 2 may be configured as a fully electric vehicle, incorporating fuel cells, solar energy capturing elements, and/or other energy storage systems for powering the vehicle, in which case the internal combustion engine 4 may be replaced with an electric motor.

As shown, an instrument panel 6 may include various displays and controls accessible to a driver (also referred to as the user) of vehicle 2. For example, instrument panel 6 may include a touch screen 8 of an in-vehicle computing system 9 (e.g., an infotainment system), an audio system control panel, and an instrument cluster 10. While the example system shown in FIG. 1 includes audio system controls that may be performed via a user interface of in-vehicle computing system 9, such as touch screen 8 without a separate audio system control panel, in other embodiments, the vehicle may include an audio system control panel, which may include controls for a vehicle audio system such as a radio, compact disc player, MP3 player, etc. The audio system controls may include features for controlling one or more aspects of audio output via speakers 12 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 9 may adjust a radio station selection, a playlist selection, a source of audio input (e.g., from radio or CD or MP3), etc., based on user input received directly via touch screen 8, or based on data regarding the user (such as a physical state and/or environment of the user) received via external devices 50 and/or mobile device 28.

In some embodiments, one or more hardware elements of in-vehicle computing system 9, such as touch screen 8, a display screen, various control dials, knobs and buttons, memory, processor(s), and any interface elements (e.g., connectors or ports) may form an integrated head unit that is installed in instrument panel 6 of the vehicle. The head unit may be fixedly or removably attached in instrument panel 6. In additional or alternative embodiments, one or more hardware elements of the in-vehicle computing system may be modular and may be installed in multiple locations of the vehicle.

The cabin 1 may include one or more sensors for monitoring the vehicle, the user, and/or the environment. For example, the cabin 1 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 1, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 50 and/or mobile device 28.

Cabin 1 may also include one or more user objects, such as mobile device 28, that are stored in the vehicle before, during, and/or after travelling. The mobile device may include a smart phone, a tablet, a laptop computer, a portable media player, and/or any suitable mobile computing device. The mobile device 28 may be connected to the in-vehicle computing system via communication link 30. The communication link 30 may be wired (e.g., via Universal Serial Bus [USB], Mobile High-Definition Link [MHL], High-Definition Multimedia Interface [HDMI], Ethernet, etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 30 may provide sensor and/or control signals from various vehicle systems (such as vehicle audio system, climate control system, etc.) and the touch screen 8 to the mobile device 28 and may provide control and/or display signals from the mobile device 28 to the in-vehicle systems and the touch screen 8. The communication link 30 may also provide power to the mobile device 28 from an in-vehicle power source in order to charge an internal battery of the mobile device.

In-vehicle computing system 9 may also be communicatively coupled to additional devices operated and/or accessed by the user but located external to vehicle 2, such as one or more external devices 50. In the depicted embodiment, external devices 50 are located outside of vehicle 2 though it will be appreciated that in alternate embodiments, external devices may be located inside cabin 1. The external devices may include a server computing system, personal computing system, portable electronic device, electronic wrist band, electronic head band, portable music player, electronic activity tracking device, pedometer, smart-watch, GPS system, etc. External devices 50 may be connected to the in-vehicle computing system via communication link 36, which may be wired or wireless, as discussed with reference to communication link 30, and configured to provide two-way communication between the external devices and the in-vehicle computing system. For example, external devices 50 may include one or more sensors and communication link 36 may transmit sensor output from external devices 50 to in-vehicle computing system 9 and touch screen 8. External devices 50 may also store and/or receive information regarding contextual data, user behavior/preferences, operating rules, etc. and may transmit such information from the external devices 50 to in-vehicle computing system 9 and touch screen 8.

In-vehicle computing system 9 may analyze the input received from external devices 50, mobile device 28, and/or other input sources and select settings for various in-vehicle systems (such as climate control system or audio system), provide output via touch screen 8 and/or speakers 12, communicate with mobile device 28 and/or external devices 50, and/or perform other actions based on the assessment. In some embodiments, all or a portion of the assessment may be performed by the mobile device 28 and/or the external devices 50.

In some embodiments, one or more of the external devices 50 may be communicatively coupled to in-vehicle computing system 9 indirectly, via mobile device 28 and/or another of the external devices 50. For example, communication link 36 may communicatively couple external devices 50 to mobile device 28 such that output from external devices 50 is relayed to mobile device 28. Data received from external devices 50 may then be aggregated at mobile device 28 with data collected by mobile device 28, the aggregated data then transmitted to in-vehicle computing system 9 and touch screen 8 via communication link 30. Similar data aggregation may occur at a server system and then transmitted to in-vehicle computing system 9 and touch screen 8 via communication link 36/30.

In the example environment illustrated in FIG. 1, the in-vehicle computing system 9 may be connected to one or more vehicle systems, such as speakers 12, display 8, vehicle sensors, and/or other suitable vehicle systems via any suitable network. In some examples, the in-vehicle computing system 9 includes a talker device configured to transmit audio/video data to listener devices, such as speakers 12 and display 8 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talkers and the listeners may be configured to communicate over the AVB network using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 related to a possible data streaming format. Other AVB-related standards and protocols, and/or other versions of the AVB standards and protocols, previously, currently, or later developed, may additionally or alternatively be used.

It is to be understood that FIG. 1 depicts one example environment, however the communication systems and methods described herein may be utilized in any suitable environment. Any suitable devices that transmit and/or receive information, sense data, and/or otherwise contribute to a driver distraction detection and/or alert system may be utilized as the systems and/or to perform the methods described herein.

Controller 90 is shown receiving information from a plurality of sensors 92 (various examples of which are described herein) and sending control signals to a plurality of actuators 94 (various examples of which are described herein). Sensors may include an electrical docking component of the vehicle 2 and actuators 94 may include a charger of the docking component.

The vehicle 2 further includes a cooling system 86. The cooling system 86 may include one or more of an air conditioner, a fan, a coolant circuit, and the like. The cooling system 86 may be configured to provide zonal cooling to the interior of the cabin based on either an operator request or a temperature of a speaker. As will be described below, various zones of the cooling system 86 may be activated in response to a portable speaker temperature exceeding a threshold temperature during vehicle on and off conditions. As such, cooling to cabin 1 may be provided independent of an operator request during some conditions.

In the example of FIG. 1, the speaker 12 may be a portable speaker, wherein the speaker 12 may be removed from the interior cabin and used outside of the vehicle 2. The speaker 12 may comprise a second component, such as a battery or electrical package removable therefrom. As such, a lifespan of the speaker 12 may be increased as battery life, Bluetooth technology, and the like advance. That is to say, the speakers with integrally arranged battery units may become obsolete as their power decays over time. The speaker 12 may receive a new battery, which may include improved battery life, charging abilities, and the like relative to the previous battery. The speaker 12 may be used by the operator at locations distal to the vehicle, such as at a park, a beach, a home, and the like.

A location 14 illustrates a dashboard location in which a portable speaker may be mounted. The location 14 may comprise a mechanical mounting and/or an electrical mounting for maintaining the portable speaking in the location 14. The mechanical mounting may allow the portable speaker to fixedly remain in a position while being electrically decoupled from the vehicle. As such, the mechanical coupling may not allow a battery of the portable speaker to recharge via a battery of the vehicle. Alternatively, the electrical coupling may allow the portable speaker to receive power from the battery while fixedly remaining in the position such that the portable speaker battery may be recharged via a vehicle battery 88 while the vehicle is in use and the portable speaker is docked.

The location 14 illustrates a dashboard speaker and the speaker 12 illustrates a door mounted speaker. Temperatures at the dashboard speaker and the door mounted speaker may be different. In one example, the dashboard speaker may experience higher temperatures than the door mounted speaker such that cooling demands of the dashboard speaker may be higher than that of the door mounted speaker. A method for cooling portable speakers arranged in the vehicle 2 based on a temperature of a speaker reaching a threshold temperature is described below.

In this way, the vehicle 2 comprises areas in which one or more portable speakers may be docked. In some examples of the vehicle 2, the vehicle may be free of built-in speakers, wherein the audio system of the vehicle 2 may only comprise portable speakers. Built-in speakers may differentiate from the portable speakers in that built-in speakers may not play audio when removed from the vehicle 2. Additionally or alternatively, built-in speaker may demand one or more electrical wires to be decoupled and/or cut to be removed from the vehicle 2, wherein the built-in speaker is no longer able to function upon removal. In contrast, the portable speaker may be docked via a cable or a docking interface arranged on a visible portion of the cabin 1. The portable speaker may be undocked relatively quickly be disengaging the cable or the docking interface while still retaining function. As such, an operator may customize the audio system with a plurality of portable speakers to provide a customized audio entertainment experience.

Figure 2:
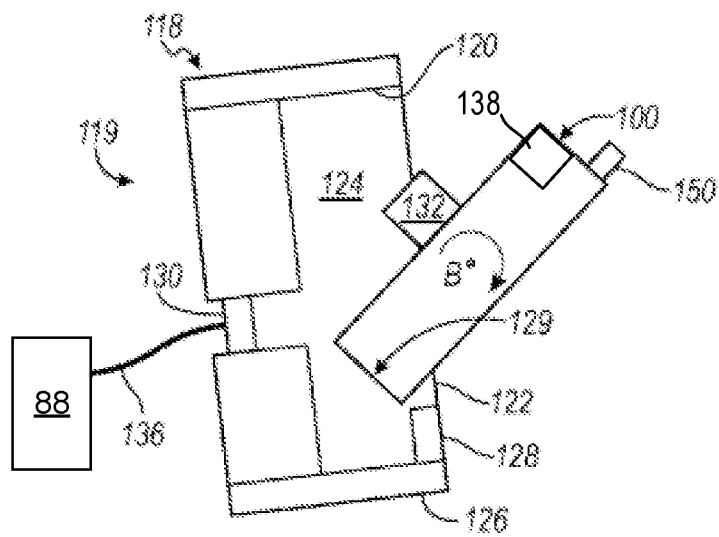
FIG. 2 illustrates a side view of a speaker system of a vehicle illustrated adjacent to a docking station within the vehicle.
Figure 3:
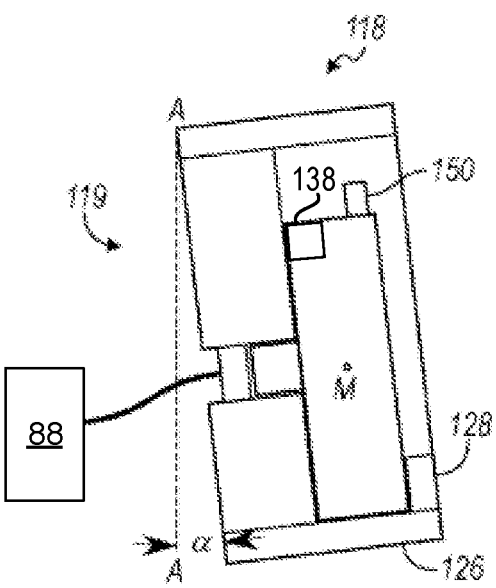
FIG. 3 illustrates another side view of the speaker system mounted to the docking station.

Referring to FIGS. 2-3, a speaker system 100 mounts to a docking station 118. The speaker system 100 and docking station 118 are collectively referred to as a speaker assembly 119 herein. The docking station 118 includes a recess 120 that is formed into a panel 122 of the vehicle 2 of FIG. 1. The recess 120 defines a cavity 124 that is sized for receiving the speaker system 100. The docking station 118 includes a base 126 for supporting the speaker system 100 and a projection 128 that extends transversely from an inner end of the base 126. The panel 122 is offset at an angle (a) from a vertical axis (A) according to the illustrated embodiment. The angle (a) of the panel 122 biases the center of mass (m) of the speaker system 100 towards the panel 122; and the projection 128 engages a lower end 129 of the speaker system 100 to help retain the speaker system 100 within the recess 120.

The docking station 118 includes an electrical connector 130 that mates with a corresponding speaker connector 132 of the speaker system 100. The electrical connector 130 is connected to a vehicle battery by a vehicle harness 136; and the speaker connector 132 is connected to a speaker battery 138, which may be electrically coupled to the vehicle battery via the interfacing between the electrical connector 130 and the speaker connector 132. As such, the mounting illustrated in the embodiments of FIGS. 2 and 3 is an electrical mounting. In this way, the speaker system 100, which is a portable speaker system, may be controlled via an interface of the vehicle via a wired connection. In the present example, the speaker system 100 may be used in conditions where the battery 138 is removed. That is to say, the speaker system 100 may be a portable speaker system comprising a removable component (e.g., the battery 138). As such, the battery 138 may be exchanged for a different battery or may be omitted while mounting the speaker system 100 into the docking station 118 of the vehicle. The battery 138 may optionally include an electrical package including an amplifier, Bluetooth, transducer, and other electrical components for operating the speaker 132. When the speaker system 100 is removed, the vehicle harness 136 is not. That is to say, the vehicle harness 136 and the electrical connector 130, which are electrically coupled to a vehicle battery are not removed when the speaker system 100 is removed.

In examples where the mounting is a mechanical mounting, the portable speaker system may be wirelessly connected to the interface via Bluetooth or another wireless connection.

Figure 4:
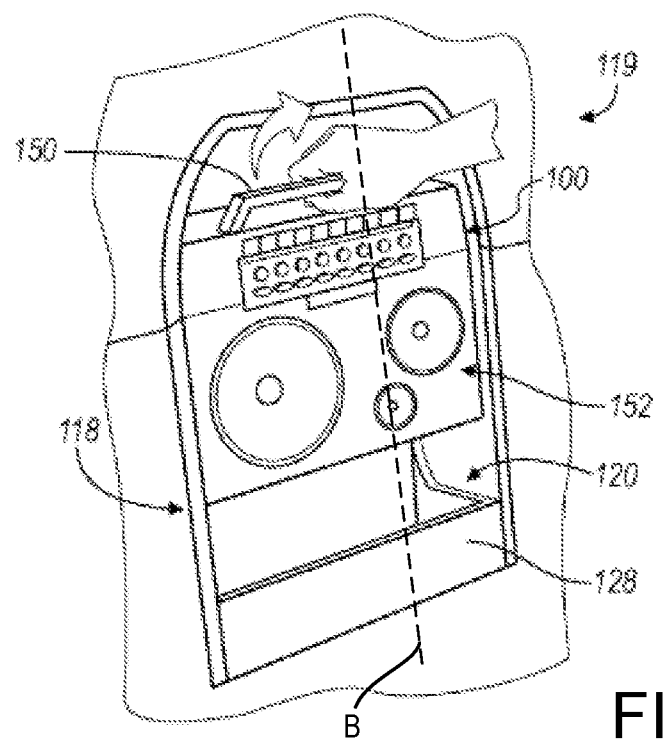
FIG. 4 illustrates a front perspective of the speaker system.

FIGS. 2-3 illustrate a process for mounting the speaker system 100 to the docking station 118. As shown in FIG. 2, the speaker system 100 is rotated clockwise about an imaginary horizontal axis B, and the lower end 129 is inserted into the recess 120. Then, the speaker system 100 is rotated counter-clockwise about the B-axis until the speaker connector 132 mates with the electrical connector 130, as shown in FIG. 3. With reference to FIG. 4, to remove the speaker system 100 from the docking station 118, a user pulls a handle 150 that extends from an upper end of the speaker system 100, which rotates the speaker system 100 clockwise about the B-axis, and then lifts the speaker system 100 out of the recess 120. The speaker system 100 illustrated in FIGS. 2-4 depicts a "retro" 1980's styled speaker system with a rectangular shaped front facie 152. The example of FIG. 4 is merely one example of removing the portable speaker system from the docking station 118. In some examples, the portable speaker system may be removed via turning the speaker system against threads, adjusting a latch, and the like, without departing from the scope of the present disclosure.

Figure 5:
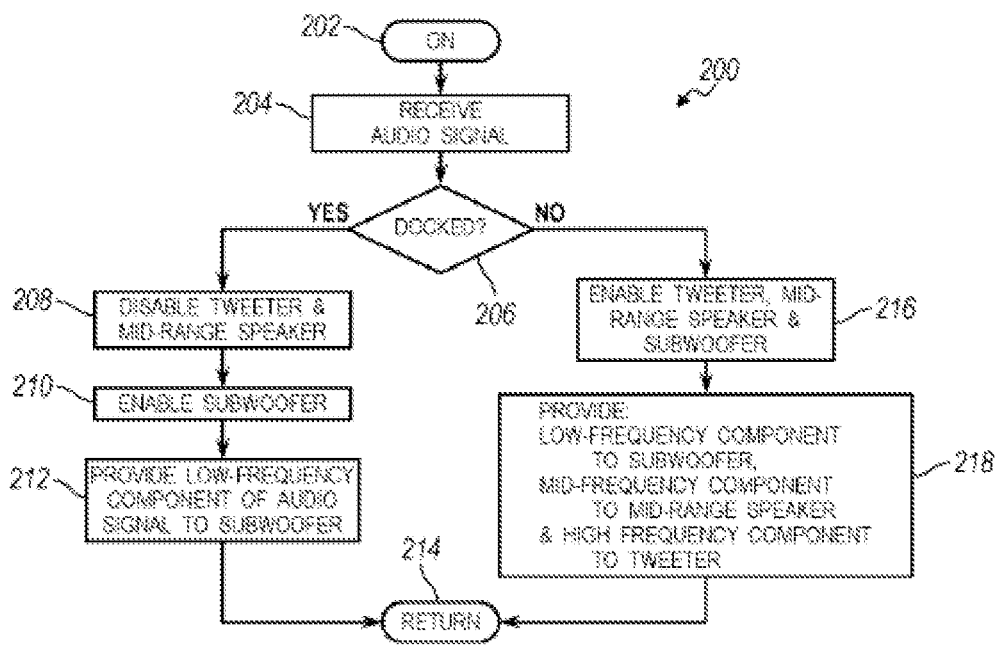
FIG. 5 illustrates a flow chart illustrating a method for controlling the speaker system.

FIG. 5 illustrates a method for controlling the speakers of the speaker system 100 according to one or more embodiments, and is represented by numeral 200. The method 200 is implemented using software code contained within memory the controller (e.g., in-vehicle computing system of FIG. 1) according to one or more embodiments. In other embodiments the software code is shared between multiple controllers.

At operation 202, the controller receives an "on" command. The on command is transmitted to the controller in response to a user pressing a button on the speaker system 100 itself, or by the user sending the command wirelessly, e.g., from a media device. Alternatively, the controller may turn on automatically in response to receiving electrical energy through the charging circuit (such as electrical connector 130) when mounted to the docking station 118 in the vehicle 2.

At operation 204, the controller receives an audio signal. The audio signal may be transmitted by a sensor of the vehicle audio system or by a media device.

At operation 206, the controller determines whether or not the speaker system 100 is mounted to the docking station, i.e., "docked". In one embodiment, the controller determines that the speaker system 100 is docked in response to receiving electrical energy from the vehicle battery 88 through the charging circuit. In other embodiments, the controller determines the location of the speaker system 100 relative to the vehicle using a known localization method. If the controller determines that the speaker system 100 is docked within the vehicle 2, it proceeds to operation 208.

At operation 208, the controller disables a mid-range speaker and a tweeter, e.g., by not providing electrical power to the speakers. In one example, the mid-range speaker and the tweeter are integrally arranged in vehicle 2. Then at operation 210, the controller enables the subwoofer, e.g., by providing power to it.

At operation 212, the controller provides the low-frequency component of the audio signal to the subwoofer. And the subwoofer provides low-frequency sound corresponding to the low-frequency component of the audio signal, as part of the vehicle audio system. Then the controller proceeds to operation 214 and returns to operation 204.

If the controller determines that the speaker system is not docked in operation 206, then it proceeds to operation 216. At operation 216, the controller enables the subwoofer, the mid-range speaker, and the tweeter, e.g., by providing power to them.

At operation 218, the controller separates the audio signal by frequency and provides the low-frequency component of the audio signal to the subwoofer, the medium-frequency component to the mid-range speaker, and the high-frequency component to the tweeter. The built-in speakers provide sound corresponding to their received component of the audio signal and collectively provide full-range sound. Then the controller proceeds to operation 214 and returns to operation 204.

Figure 6:
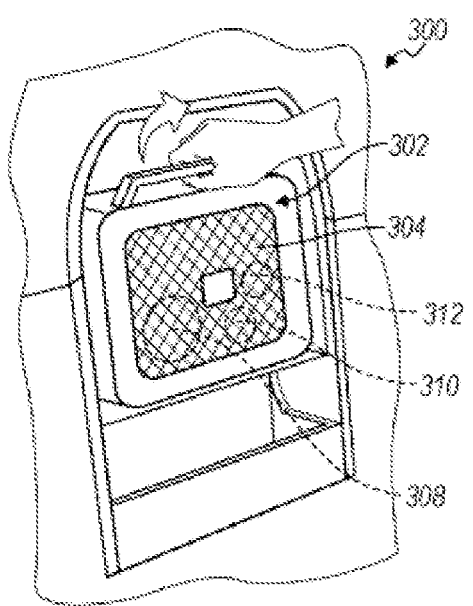
FIG. 6 illustrates another front perspective of an additional embodiment of the speaker system.
Figure 7:
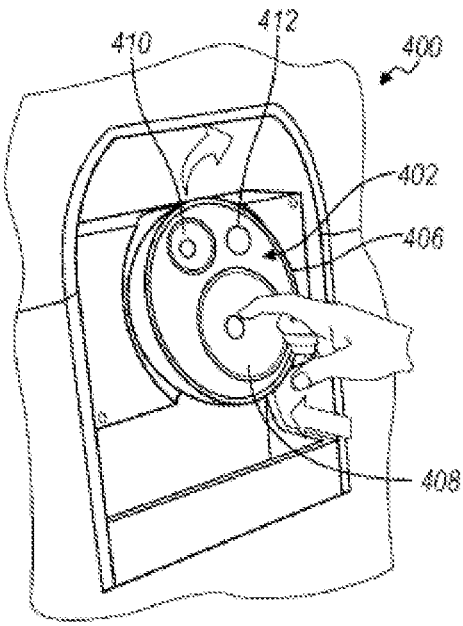
FIG. 7 illustrates a further front perspective view of a further embodiment of the speaker system.

FIG. 6 illustrates a portable speaker system 300 having a rectangular shaped front facie 302 with a baffle 304 disposed over the speakers, i.e., a subwoofer 308, a mid-range speaker 310 and a tweeter 312. FIG. 7 illustrates a speaker system 400 having a circular shaped front facie 402 that is detachable from a rectangular housing 406. A subwoofer 408 is supported by the housing 406. A mid-range speaker 410 and a tweeter 412 are supported by the detachable front facie 402. In one example, the portable speaker system 300 and 400 may be used identically to speaker 12 or FIG. 1 or docked into location 14 of FIG. 1.

It will be appreciated that one or more of the subwoofer, the mid-range speaker, and the tweeter may be configured as portable speakers according to embodiments of the present disclosure. As described above, the portable speaker is a modular speaker wherein a removable battery is included with the portable speaker. The battery may be optionally removed from a housing of the speaker. In some examples, the battery may be removed from the speaker housing and the speaker, wherein the speaker may be docked into a docking station of the vehicle without the battery such that the speaker may be powered via a vehicle battery. That is to say, the portable speaker may be docked into an electrical mount of the vehicle, wherein an electrical connection of the portable speaker may couple to an electrical connection of the vehicle and receive power from the vehicle battery to power the portable speaker without the battery. In one example, an advantage of configuring a portable speaker with a removable battery is to allow an operator to replace the battery with a different battery. In this way, as battery technologies improve, an original battery may be replaced with a newer, improved battery. Furthermore, the battery may comprise an electronics package, which may comprise Bluetooth, an amplifier, and the like, which may also be optionally replaced as technologies improve. The electronics package may further comprise a cable docking port, wherein the cable docking port receives a corresponding cable (such as a USB-A, USB-B, USB-C, mini-USB, micro USB, USB 3, and the like) to electrically couple the portable speaker to an external device (e.g., a phone). By replacing the electronics package, the cable docking port type may be switched to match a desired cable docking port type (e.g., from USB-A to mini-USB).

Figure 8:
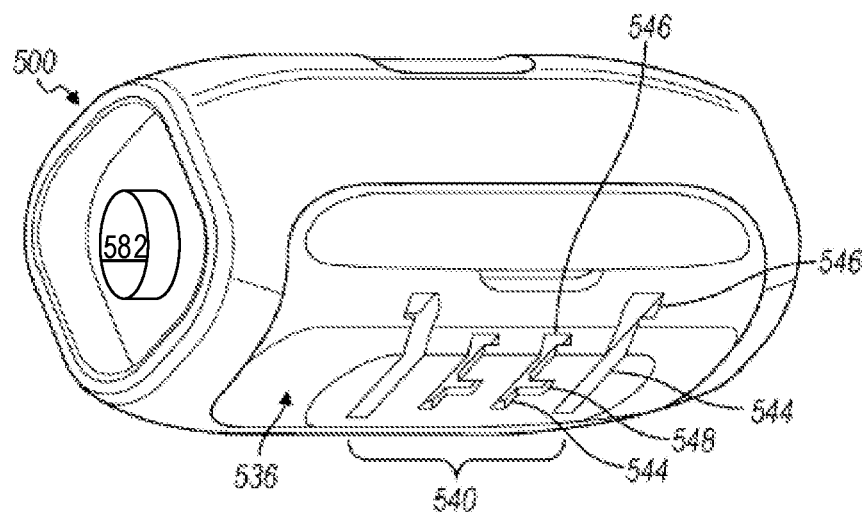
FIG. 8 illustrates a bottom view of an example portable speaker.
Figure 9:
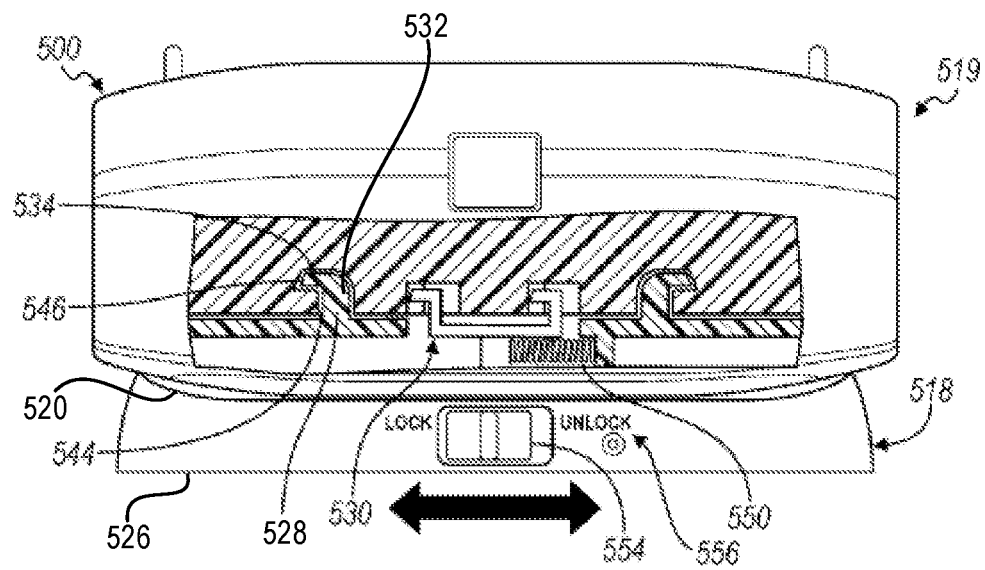
FIG. 9 illustrates a front fragmented partial section view of the speaker system.

With reference to FIGS. 8 and 9, the portable speaker system 500 mounts to a docking station 518, and both are collectively referred to as a speaker assembly 519. The docking station 518 is mounted within a rear storage compartment according to one or more embodiments. Additionally or alternatively, the docking station 518 may be arranged in other areas of the vehicle, including a passenger door, an arm rest, a head rest, a seat, a dashboard, a vehicle trunk, a vehicle instrument panel, and the like without departing form the scope of the present disclosure. The docking station 518 includes a recess 520 that defines a cavity that is sized for receiving the speaker system 500. The docking station 518 includes a base 526, into which the recess 520 is shaped, for supporting the speaker system 500 and a series of projections that extend transversely from the base 526. The series of projections include fixed projections 528 and locking projections 530. Each projection 528, 530 includes an upright portion 532 that extends from the base 526; and a distal end 534 that extends transversely from the upright portion 532. The distal ends 534 of the projections 528, 530 engage a lower end 536 of the speaker system 500 to help retain the speaker system 500 within the recess 520.

The docking station 518 may include an electrical connector that mates with a corresponding speaker connector of the speaker system 500. The electrical connector is connected to the vehicle battery 88 by a vehicle harness 136 (shown in FIG. 2); and the speaker connector is connected to a speaker battery by speaker wires to collectively form a charging circuit for charging the speaker battery.

The speaker system 500 and the docking station 518 each include features for locking the speaker system 500 to the docking station 518, according to one or more embodiments. As shown in FIG. 8, each channel 540 is formed with a narrow passage 544 extending from the lower end 536 of the housing 506 that is sized for receiving the upright portion 532 of the corresponding projection. Each channel 540 is also formed with an enlarged opening 546 that is sized for receiving the distal end 534 of the corresponding projection. The central channels 540 also include an intermediate opening 548 that extends from the lower end 536 to the enlarged opening 546 of the corresponding channel. The locking projections 530 are spring-biased in a longitudinal direction to engage the lower end 536 of the housing 506 within the corresponding intermediate opening 548 to lock the speaker system 500 to the docking station 518.

According to the illustrated embodiment, the locking projections 530 are connected to each other by a movable base 550, and the docking station 518 includes a compression spring 552 that engages a lower portion of the movable base 550 to bias the locking projections 530 longitudinally (to the left in FIG. 9) to the locked position. The docking station 518 includes a lever 554 that extends from the movable base 550 that allows for manual translation of the locking projections 530. A user may manually translate the lever 554 to the right in FIG. 9 to compress the spring 552, which translates the locking projections 530 out of the intermediate openings 548 to unlock the speaker system 500 from the docking station 518. Once unlocked, the user may remove the speaker system 500 by translating it transversely away from the docking station 518. In one embodiment, the docking station 518 includes informational indicia 556 on the base 526 and adjacent to the lever indicating which position the lever 554 is in, e.g., "locked" or "unlocked."

Other embodiments of the speaker assembly 519 contemplate projections extending from the housing of the speaker system 500 to engage the docking station 518 for retaining the speaker system to the docking station (not shown). Another embodiment of the speaker assembly 519 includes a magnetic interface for retaining the speaker system to the docking station (not shown).

The speaker system 500 is illustrated with a removable battery 582 configured to be optionally removed from the speaker system 500. In some examples, the speaker system 500 may not dock with the docking station 518 when the battery 582 is coupled thereto (e.g., not removed from the speaker system 500). As such, the speaker system may comprise only one connector configured to connect to each of the removable battery 582 and the docking station 518. Additionally or alternatively, the removable battery 582 may be coupled to the speaker system 500 while the speaker system 500 is docked to the docking station 518. As such, the speaker system 500 may comprise two connectors, a first connector configured to couple to the removable battery 582 and a second connector configured to couple to the docking station 518, wherein the first connector is different than the second connector.

Figure 10A:
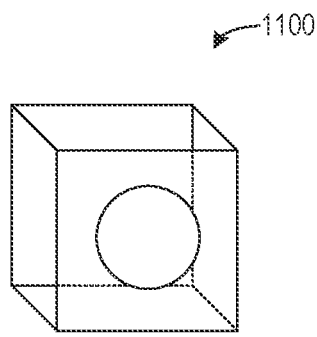
FIGS. 10A and 10B illustrate different types of speakers in which the portable speaker may embody.

FIG. 10A illustrates an example 1100 of the portable speaker, wherein the portable speaker is a portable subwoofer. The portable subwoofer may be configured to electrically dock and/or mechanically couple to a mount in a vehicle. The portable subwoofer may further comprise a removable component, wherein the removable component comprises one or more of a battery and/or an electrical cartridge. The electrical cartridge may comprise one or more components including amplifiers, Bluetooth, and the like.

Figure 10B:
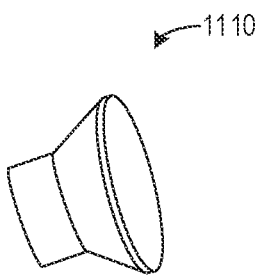

FIG. 10B illustrates an example 1110 of the portable speaker, wherein the portable speaker is a portable tweeter. The portable tweeter may be configured to electrically dock and/or mechanically couple to a mount in a vehicle. The portable tweeter may further comprise a removable component, wherein the removable component comprises one or more of a battery and/or an electrical cartridge. The electrical cartridge may comprise one or more components including amplifiers, Bluetooth, and the like.

Figure 10C:
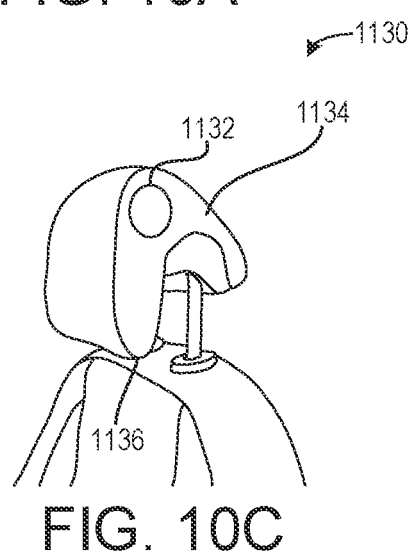
FIGS. 10C and 10D illustrate different positions within the vehicle in which the portable speaker is docked and/or mechanical coupled.
Figure 10D:
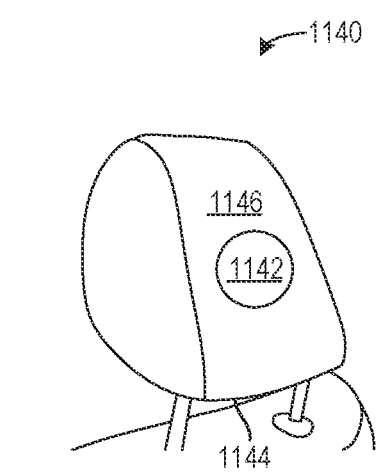
Figure 10E:
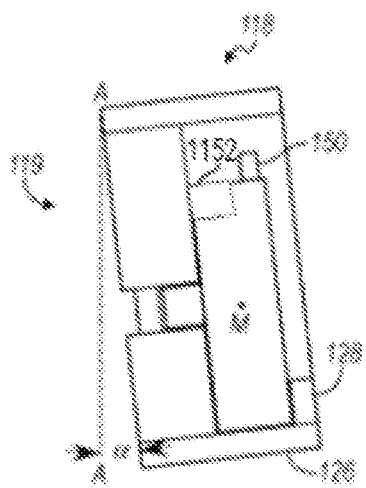
FIG. 10E illustrates the portable speaker docked without a battery.

FIGS. 10C and 10D illustrate various positions in which a portable speaker may be docked. As described earlier, the portable speaker may be docked onto a dashboard. FIG. 10C illustrates an example 1130 of a portable speaker 1132 docked in a side 1136 of a head rest 1134. FIG. 10D illustrates an example 1140 of a portable speaker 1142 docked in a back side 1146 of a head rest 1144. FIG. 10E illustrates an example 1150 of a portable speaker docked in a docking station without a battery. The example 1150 is similar to the example illustrated in FIG. 3 except that battery 138 is optionally removed from the speaker system 100 while being docked in the docking station 118. As such, a battery port 1152 is exposed wherein the battery port 1152 is shaped to receive a battery, such as battery 138 of FIGS. 2 and 3.

Turning to FIG. 11 it shows a comparison of a portable speaker 1210 docked within a vehicle 1200 and used in an environment 1250 outside of the vehicle 1200. The vehicle comprises a music source 1202, electronics 1204, an in-car dock 1206 and a connector 1208. The music source may include one or more of a radio, stereo, phone, tablet, laptop, portable music player, and the like. The electronics 1204 may include a controller (e.g., controller 90 of FIG. 1), music player, and other components utilized to communicate with the music source 1202 and the portable speaker 1210 via the in-car dock 1206. The in-car dock 1206 comprises a portion of the connector 1208 which is configured to interface with a separate portion of the connector 1208 corresponding to the speaker 1210. The connector 1208 may be an electrical connector wherein the connector 1208 provides a means for communicating with the speaker 1210. Additionally or alternatively, the connector 1208 may be a mechanical connector such that the connector 1208 is only configured to physically couple to the speaker 1210 without providing a means for communication between the electronics 1204 and the speaker 1210. In the example of FIG. 11, the battery and electronics 1220 are separated from the speaker 1210 when used in the vehicle 1200. As such, the connector 1208 is an electrical connector in the example of FIG. 11, wherein a vehicle battery is used to power the speaker 1210. The battery portion of the battery and electronics 1220 may be recharged via an in-car charging station 1222. As such, the battery and electronics 1220 are removed and outside of the speaker 1210 and are not used to power the speaker 1210 or provide a channel of communication between the speaker 1210 and the electronics 1204.

In the example of FIG. 11 where the speaker 1210 is used outside 1250 of the in-car dock 1206 of the vehicle 1200 so that the speaker 1210 not docked in the in-car dock 1206. To use the speaker 1210, the battery and electronics 1220 are coupled to the speaker 1210 via the connector 1208. A such, a portion of the connector 1208 corresponding to the battery and electronics 1220 may be identical to the portion of the connector 1208 corresponding to the in-car dock 1206.

In one example, the music source 1202 communicates with the battery and electronics 1220 of the speaker 1210 via a Bluetooth source 1252. In one example, the Bluetooth source is a component of the electronics 1204 of the vehicle. Thus, in one example, a CD may be inserted into a vehicle entertainment system, wherein the entertainment system is wirelessly connected to the speaker 1210 via Bluetooth, wherein audio corresponding to the CD is played through at least the speaker 1210. Additionally or alternatively, the audio played through the speaker 1210 may be harmonized with audio played through non-portable speakers of the vehicle. For example, if the speaker 1210 is a tweeter, then the electronics may harmonize the audio through the speaker 1210 with a subwoofer or mid-range speaker of the vehicle.

As another example, an external charging 1260 may communicate with the battery and electronics 1220. The external charging 1260 may include a wired or wireless connection, as described above.

As a further example, a portable Bluetooth device 1270 may be in communication with the speaker 1210 via the battery and electronics 1220 without use of any electronics 1204 of the vehicle 1200. In such an example, the speaker 1210 may be used to play audio outside of the vehicle 1200, wherein outside of the vehicle is outside of a body of the vehicle.

In some examples, additionally or alternatively, the battery and electronics 1220 may comprise memory configured to store audio files that may be played directly through the speaker 1210 without a Bluetooth connection. As such, different battery and electronics 1220 may comprise different audio files saved thereon.

Turning now to FIGS. 12A and 12B, they show different embodiments 1300 and 1350 of a portable speaker, respectively. In the embodiment 1300 of FIG. 12A, a portable speaker 1310 comprises a connector 1312 configured to interface with a connector 1322 of a battery and electronics cartridge 1320. When the battery and electronics cartridge 1320 is not coupled with the speaker 1310, the speaker 1310 may not comprise power or Bluetooth capabilities such that the speaker 1310 may not play audio without an external source of power.

In the embodiment 1350 of FIG. 12B, a portable speaker 1360 comprises a first connector 1362 and an electronics package 1364. A battery 1370 comprises a second connector 1372 which is configured to interface with and electronically couple the battery 1370 to the portable speaker 1360. Thus, in the embodiment 1360, the portable speaker 1360 may wirelessly communicate to other devices while the battery 1370 is not coupled thereto so long as a separate power source is coupled to the portable speaker 1360. For example, the portable speaker 1360 may be docked in a docking station of the vehicle without the battery 1370 such that a vehicle battery may power the portable speaker 1360. The portable speaker 1360 may communicate with an external device via the electronics package 1364 without assistance from electronics of the vehicle. In the example of FIG. 12B, the electronics package 1364 may not be removed from the speaker 1360.

FIGS. 1-4, and 6 to 12B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 13:
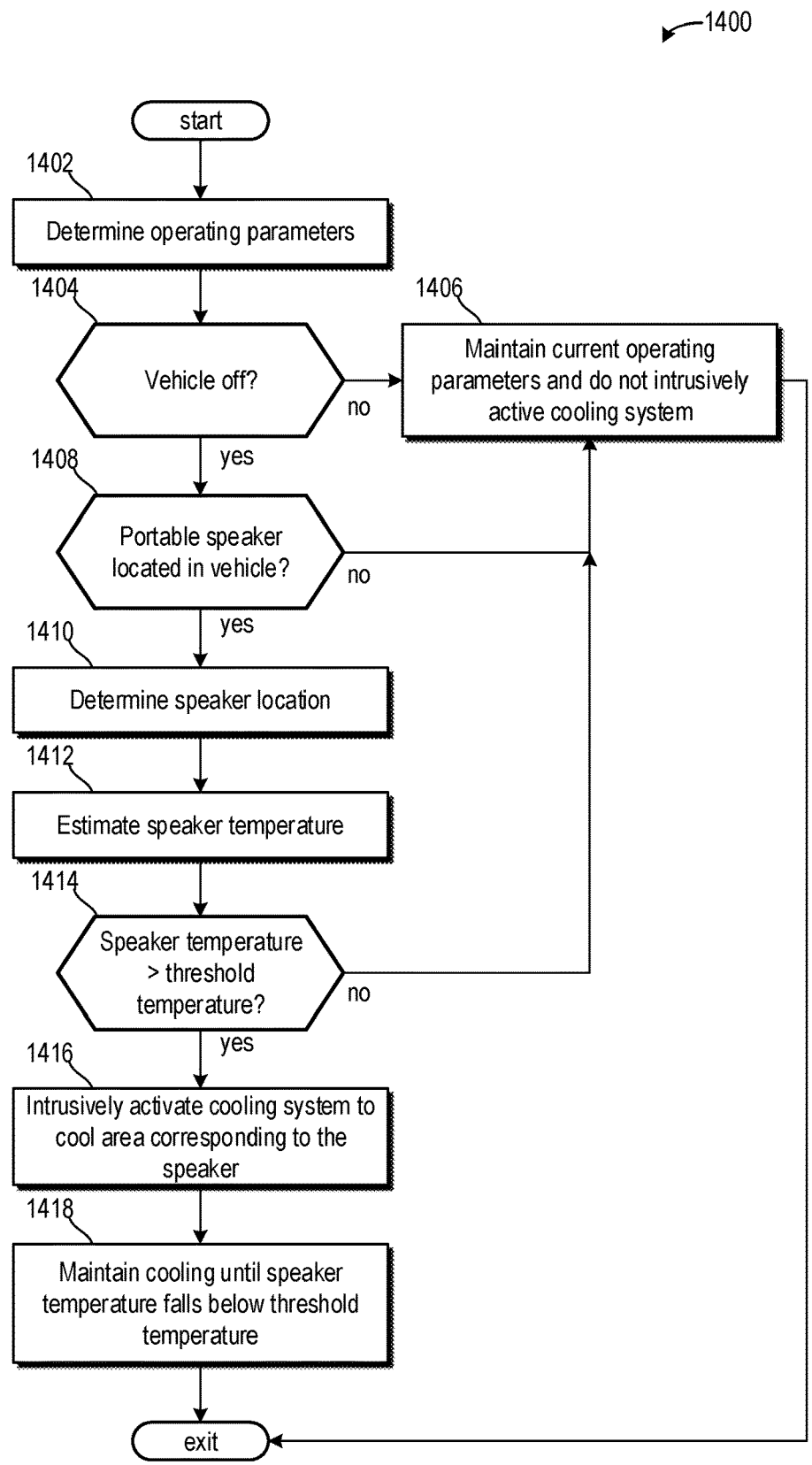
FIG. 13 illustrates a method for adjusting a vehicle cooling based on a position and temperature of the portable speakers.

Turning now to FIG. 13, it illustrates a method 1400 for adjusting a vehicle cooling in response to a location and a temperature of a portable speaker docked in a car. Instructions for carrying out method 1400 and the rest of the methods included herein may be executed by a controller based on instructions stored on a memory of the controller and in conjunction with signals received from sensors of the engine system, such as the sensors described above with reference to FIG. 1. The controller may employ actuators of the vehicle to adjust operation, according to the methods described below.

The method 1400 begins at 1402, which includes determining operating parameters. Operating parameters may include one or more of a speaker temperature, cabin temperature, engine operation, and the like.

The method 1400 proceeds to 1404, which includes determining if the vehicle is off. The vehicle may be off if the engine is shut-off (e.g., not combusting or no power being supplied thereto). Additionally or alternatively, the vehicle may be off if the battery is not supplying power to an electric motor of the vehicle. If the engine is not shut-off then the method 1400 proceeds to 1406, which includes maintaining current operating parameters and does not intrusively activate a cooling system.

If the vehicle is off, then the method 1400 proceeds to 1408 which includes determining if a portable speaker is arranged in the vehicle. The portable speaker may be arranged in the vehicle if the portable speaker is docked into a docking station. If a portable speaker is not arranged in the vehicle, then the method 1400 proceeds to 1406 as described above and does not intrusively active the cooling system.

If the portable speaker is arranged in the vehicle, then the method 1400 proceeds to 1410, which includes determining the speaker location. In some examples of the method 1400, the method may proceed to 1410 following determination of at least one portable speaker being arranged in the vehicle even when the vehicle is on. As such, determination of the vehicle being off may be omitted in some examples of the method 1400.

Determining the speaker location may include determining if the speaker is located in a passenger door, a head rest, an arm rest, a dashboard, a trunk, or other area. The location may be determined via Bluetooth, feedback from a connection between the portable speaker and the docking station, a position sensor, or other device. Additionally or alternatively, a visualization device, such as a camera, arranged within an interior of the vehicle may be used to determine a location of the speaker.

The method 1400 proceeds to 1412, which includes estimating a speaker temperature. In one example, the speaker temperature is estimated based on a cabin temperature. Additionally or alternatively, the speaker temperature may be estimated based on a combination of the cabin temperature, the speaker location, and an ambient weather. For example, for a given cabin temperature, a speaker temperature of a speaker arranged on a dashboard during a sunny day may be higher than a speaker temperature of a speaker arranged on a vehicle door. Additionally or alternatively, the speaker and/or the docking station may comprise a temperature sensor for directly measuring the speaker temperature.

The method 1400 proceeds to 1414, which includes determining if the speaker temperature is greater than a threshold temperature. The threshold temperature may be based on a temperature at which the portable speaker may degrade. In one example, degradation of the portable speaker may result in undesired functioning of a battery and/or electronics of the speaker such that the speaker may no longer be able to play audio. In some examples, the threshold temperature may be adjusted for a docked portable speaker where the battery and/or the electronics package are removed therefrom. Furthermore, it will be appreciated that a time in which the speaker temperature may exceed the threshold temperature may be based on the speaker location, wherein the speaker arranged on the dashboard may exceed the threshold temperature more quickly than a speaker arranged on a head rest on a sunny day.

If the speaker temperature is less than or equal to the threshold temperature, then the method 1400 proceeds to 1406 as described above. If the speaker temperature is greater than the threshold temperature, then the method 1400 proceeds to 1416, which includes intrusively activating a cooling system (e.g., cooling system 86 of FIG. 1) to cool an area corresponding to the speaker. For example, if the vehicle comprises portable speakers arranged on the dashboard, the passenger door, and the head rest and only the dashboard and head rest speaker temperatures exceed the threshold temperature, then the cooling system may only activate vents directed to cooling the dashboard and the head rests without cooling the passenger door. As such, dashboard vents and vents in the head rest may be activated while a vent proximal to the passenger door (e.g., a foot vent) may not be activated. In this way, zonal cooling to provide a desired temperature control of the portable speakers left in the vehicle may be executed in an energy efficient manner.

The method 1400 proceeds to 1418, which includes maintaining the cooling until the speaker temperature is less than or equal to the threshold temperature. Once the speaker temperature no longer exceeds the threshold temperature, the corresponding portion of the cooling system may be deactivated. Continuing with the example above, if the head rest speaker no longer desires cooling, then the head rest vents may be deactivated while cooling is still provided to the dashboard speaker until its temperature falls below the threshold temperature.

In this way, active portable speakers comprising batteries and electrical packages may be docked in portions of a vehicle where sun intrusion and temperature may exceed desired threshold temperatures. The portable speakers of the present disclosure may be fitted with cheaper batteries than are less resilient to high temperature conditions relative to more expensive batteries which high temperature resistant features. These cheaper batteries that may be optionally removed from the portable speaker, provide reduced weight and cost. The technical effect of the portable battery of the present disclosure is to allow an operator to customize a vehicle sound system with one or more portable speakers than may dock and interface with a vehicle sound system while provide a configuration that allows the operator to leave the portable speaker in the vehicle without concern for elevated speaker temperatures. Furthermore, by configuring the battery and/or electronics package to be removed from the portable speaker, upgrades to the battery and/or electronics package may be executed more easily than in previous examples, thereby extending a longevity and useful life of the portable speaker.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a speaker configured to dock mechanically to a docking station in an area of a vehicle, wherein the speaker further comprises a removable battery; and
a controller with computer-readable instructions stored on non-transitory memory thereof that when executed enable the controller to:
determine a location of the speaker; and
activate one or more portions of a cooling system of the vehicle corresponding to the determined location of the speaker in response to a temperature of the speaker exceeding a threshold temperature, the one or more portions of the cooling system being operable to cool an interior of a cabin of the vehicle.

2. The system of claim 1, wherein the speaker further comprises an electronics package separate from the removable battery.

3. The system of claim 1, wherein the docking station further comprises an electrical connector to electrically couple a speaker connector of the speaker to a vehicle battery of the vehicle, wherein the vehicle battery is different than the removable battery.

4. The system of claim 1, wherein the speaker is configured to dock when the removable battery is removed from or coupled to the speaker.

5. The system of claim 1, wherein the speaker is one of a subwoofer, a mid-range speaker, or a tweeter.

6. The system of claim 1, wherein the speaker is configured to play audio when undocked from the docking station when the removable battery is coupled to the speaker.

7. The system of claim 1, wherein the area of the vehicle is selected from one of a passenger door, an instrument panel, a dashboard, a trunk, a head rest, and an arm rest.

8. A vehicle, comprising:
a plurality of docking stations arranged in a plurality of different areas of the vehicle, wherein each docking station of the plurality of docking stations is configured to receive a portable speaker operable when docked to a docking station and when not docked to a docking station, wherein the portable speaker comprises a removable battery, wherein the removable battery includes an electronics package, and wherein the electronics package comprises a cable docking port; and
a controller with computer-readable instructions stored on non-transitory memory thereof that when executed enable the controller to:
determine a location for each of one or more portable speakers within the vehicle;
estimate that a temperature for the one or more portable speakers exceeds a threshold temperature; and
activate one or more portions of a cooling system of the vehicle to cool each determined location corresponding to the one or more portable speakers estimated to exceed the threshold temperature.

9. The vehicle of claim 8, wherein all speakers of the vehicle are configured to be portable.

10. The vehicle of claim 8, wherein each of the plurality of different areas is selected from one of a passenger door, an instrument panel, a dashboard, a trunk, a head rest, and an arm rest.

11. The vehicle of claim 8, wherein the temperature of each speaker is estimated based on one or more of a speaker location, a cabin temperature, and an ambient weather.

12. A method, comprising:
determining a location for each of one or more portable speakers of a plurality of portable speakers; and
intrusively activating one or more vents of a cooling system of a vehicle to provide zonal cooling to the location determined for each of the one or more portable speakers of the plurality of portable speakers, wherein the one or more portable speakers are docked in the vehicle, and wherein the zonal cooling is provided in response to a speaker temperature of each of the one or more portable speakers exceeding a threshold temperature, the zonal cooling provided without activating one or more other zones of the cooling system of the vehicle.

13. The method of claim 12, wherein the speaker temperature of each of the one or more portable speakers is estimated based on one or more of a speaker location, a cabin temperature, and an ambient weather.

14. The method of claim 12, wherein the vehicle is off.

15. The method of claim 12, wherein the speaker location is determined in response to feedback from Bluetooth, feedback from a connection between a portable speaker and a docking station, or a position sensor.

16. The method of claim 12, wherein the plurality of portable speakers includes a subwoofer, a mid-range speaker, and a tweeter.

17. The system of claim 1, wherein the docking station is located at a dashboard of the vehicle.

18. The system of claim 1, wherein the speaker and the docking station each include features for locking the speaker to the docking station.

19. The system of claim 1, wherein the docking station includes a recess formed into a panel of the vehicle, wherein the panel is offset at an angle from a vertical axis to bias a center of mass of the speaker toward the panel.

* * * * *